3,297,776
PROCESS FOR THE REMOVAL OF ACETYLENIC HYDROCARBONS FROM HYDROCARBON MIXTURES CONTAINING DIOLEFINES
Manfred Reich, Marl, Germany, assignor to Chemische Werke Huls Aktiengesellschaft, Kreis Recklinghausen, Germany, a corporation of Germany
No Drawing. Filed Sept. 27, 1963, Ser. No. 311,971
Claims priority, application Germany, Oct. 10, 1962, C 28,141
2 Claims. (Cl. 260—681.5)

By the thermal cracking and/or dehydrogenation of mineral oils and mineral oil fractions crude products are obtained which contain diolefines such as butadiene and isoprene. These products contain, in addition to saturated hydrocarbons and olefines, also acetylenic hydrocarbons. For many uses the acetylenic compounds are objectionable and for this reason it is necessary to separate such compounds as completely as possible prior to the use of the products.

The diolefine fractions obtained by the usual separation and working up of the above described crude products as by extraction and distillation always contain harmful amounts of acetylenic hydrocarbons. For example the butadiene fraction, after distillation, due to the similar boiling points, will contain from 0.01 to 0.2% of vinyl- and ethyl-acetylenes. In the use of such products, as for example in polymerization thereof, the content of such impurities in the recovered diolefine may be materially increased.

It is already known to separate acetylenic hydrocarbons from hydrocarbon mixtures containing diolefines by hydrogenation in the gaseous phase. This separation may be carried out by the addition of measured amounts of hydrogen at from 100 to 250° C. with the use of mixed catalysts the main component of which is copper and the second component of which is a metal whose oxide is reduced by hydrogen at below 550° C. (see U.S. Patent No. 2,426,604). Since conjugated diolefines such as butadiene are readily hydrogenated this hydrogenation process may result in a loss of diolefine amounting to several percent.

Iron containing catalysts have a somewhat better selectivity (see U.S. Patents Nos. 2,426,604 and 2,775,634). However since the hydrogenation temperature of from 175 to 345° C. is relatively high the catalyst will be rendered inactive in a short time by the contamination of its surface with polymerizates.

Aside from the hydrogenation in the gaseous phase as discussed above it is known also to hydrogenate liquid butadiene-containing $C_4$ fractions in the spray phase (see German Patent No. 1,095,808). Here also even with incomplete separation of the acetylenic hydrocarbons there is a loss of butadiene-1,3 amounting to as much as several percent.

It is further known to use copper chromite containing catalysts for the hydrogenation of diolefines to monoolefines (G. Natta, R. Rigamonti, P. Tono, Chim. e. Ind. 29 (1947), page 235; U.S. Pat. No. Patent No. 2,964,579, and French Patent No. 1,274,199).

Now it has been found that the removal of acetylenic hydrocarbons from diolefine-containing hydrocarbon mixtures by hydrogenation in the gas phase is very selective, without the conversion of diolefine to monoolefine, if the gaseous hydrocarbon mixture is passed at a temperature between 30 and 250° C. and at a pressure between 0.2 and 30 atmospheres over a mixed catalyst the main component of which is copper chromite which may contain an excess of copper and which contains also an oxide, hydroxide or salt of a metal whose oxide is not reducible by hydrogen at temperatures below 600° C.

The acetylenic hydrocarbon-containing hydrocarbon mixtures suitable for use in the process consists in general predominately of diolefines having four carbon atoms in the chain such as butadiene-1,3, butadiene-1,2, isoprene and 2,3-dimethyl-butadiene-1,3. Diolefines with longer chains such as pentadiene-1,3, pentadiene-2,4 and hexadiene-1,3 can be used. Other hydrocarbons may be mixed with the diolefines. Moreover they may contain larger amounts of hydrogen.

The hydrogenation temperature depends upon the amount of hydrogen added to or present in the gas mixture. A temperature of 80–110° C. is suitable when the proportion of hydrogen is large while 100–200° C. is suitable when the ratio of hydrogen is small. The rate of treatment of the gas depends upon the acetylenic hydrocarbon content of the mixture. The rate increases as the amount of acetylenic hydrocarbon content decreases. The amount of acetylenic hydrocarbons normally lies between 0.05 and 1% by volume and the rate of treatment for such a mixture is from 1000 to 200 liters of gas measured at normal pressure per liter of catalyst per hour.

The process can be carried out at normal pressure or at any other pressure at which the diolefine mixture is at least partially in the gaseous phase, advantageously between 0.2 and 30 atmospheres.

The mixed catalysts can be made by simultaneously impregnating a carrier material with solutions or suspensions of copper salts such as copper carbonate, copper acetate, copper formate or copper nitrate and chromic acid and solutions or suspensions of oxides, hydroxides, carbonates, nitrates, acetates, formates or other salts that may be transformed into oxides or hydroxides of one or more metals whose oxides are not reducible by hydrogen at temperatures below 600° C. If expedient these salts can be fixed on the carrier by means of an accessory material such as water glass. Suitable compounds of the added metals are compounds of the metals of groups $Ia$ and $IIa$ of the Mendeléeff Periodic System of the Elements such as, for example, calcium oxide, magnesium oxide, barium oxide, calcium carbonate, magnesium carbonate, barium carbonate, magnesium nitrate, barium nitrate, sodium hydroxide and lithium carbonate. After deposition upon the carrier the total catalyst including the carrier should contain from 5 to 50% by weight of copper, from 1 to 50% by weight of chromium and from 0.1 to 50% by weight of the added metal. A content of about 15% of copper, 3 to 10% of chromium and from 1 to 10% of the added metal is especially advantageous. If necessary the catalyst may be subjected to an intermediate heat treatment at about 500° C. Before the treatment of the catalyst with the hydrogenating gas mixture it is advantageous to reduce it in known manner in a hydrogen atmosphere at about 100–200° C. Suitable carrier materials are for example silica gel, Stuttgart mass, pumice stone, kaolin, aluminum oxide or magnesium oxide. The catalyst may be regenerated. The regeneration may be effected by first treating it with hydrogen at 200° C., then oxidizing it in air at 200–400° C. and finally reducing it with hydrogen at 100–200° C. Between regenerations the catalyst, depending upon its composition and the quality of the gas mixture to be purified, can be used on an average from 1 to 5 weeks.

In the process described the gas mixture may contain relatively large amounts of hydrogen without the diolefine being appreciably hydrogenated. On the other hand a little more hydrogen than the molecular equivalent of the acetylenic hydrocarbons is sufficient for the removal i.e. conversion of the acetylenic compounds. In the process of the invention the acetylenic compounds are so completely removed that it is not detectable by known analytical methods and is certainly less than 0.0003%.

A great advantage of the invention lies in the fact that the same selective catalyst may be used on the one hand for the treatment of a diolefine containing gas stream which has been partially purified and has a high diolefine content with only a small amount of hydrogen to free it of acetylenic hydrocarbon so that only a trace of hydrogen is left in the gas and on the other hand for the direct hydrogenation of a gas stream which, as formed, has a high content of hydrogen, without noticeable loss of its valuable diolefine content.

*Example 1*

The starting material is a $C_4$ fraction having a butadiene-1,3 content of 95.5 mol percent and a content of vinyl-, ethyl- and methylacetylene of 0.1510 mol percent (mostly ethylacetylene). This fraction is passed as a gas at the rate of 400 Nl./h. over 1 l. of catalyst with the simultaneous introduction and mixing of 1 volume percent of hydrogen in front of the hydrogenation chamber. The temperature of the hydrogenation chamber is 110–120° C. The catalyst is formed by the simultaneous addition of basic copper carbonate, chromic acid and calcium carbonate with the aid of water glass to pumice so that the content of copper is 14.5%, of chromium is 5.6% and of calcium is 1.5%. Before use the catalyst is reduced with hydrogen at 200° C. After leaving the hydrogenation chamber the hydrocarbon gas mixture contains 95.3 mol percent of butadiene-1,3. Vinyl-, ethyl- and methylacetylene are not detectable, their content being less than 0.003%.

*Example 2*

The catalyst was prepared as described in Example 1 excepting that a corresponding amount of magnesium carbonate was substituted for the calcium carbonate. The resulting catalyst contained 2% by weight of Mg, 13.5% by weight of Cu and 4.3% by weight Cr. A gas mixture having the composition shown below was passed over 1 liter of this catalyst at the rate of 430 Nl./h.

| | Mol percent |
|---|---|
| Hydrogen | 20.5 |
| n-Butane | 0.8 |
| 1- and iso-butene | 1.7 |
| Trans-butene-2 | 0.5 |
| Cis-butene-2 | 0.3 |
| Butadiene-1,3 | 75.9 |
| Butadiene-1,2 | 0.1 |
| Vinyl-, ethyl-, and methylacetylene | 0.2120 |

The hydrogenation temperature in the chamber is held at 70–80° C. After leaving the chamber the gas mixture has the following composition

| | Mol percent |
|---|---|
| Hydrogen | 20.4 |
| n-Butane | 0.8 |
| 1- and iso-butene | 1.9 |
| Trans-butene-2 | 0.7 |
| Cis-butene-2 | 0.4 |
| Butadiene-1,3 | 75.7 |
| Butadiene-1,2 | 0.1 |
| Vinyl-, ethyl-, and methylacetylene | --- |

The content of butadiene-1,3 is practically unchanged while the acetylenic compounds are so extensively removed that they are not detectable (<0.0003%).

*Example 3*

The catalyst was prepared as described in Example 1 excepting that the calcium carbonate was substituted by a corresponding amount of lithium carbonate. The resulting catalyst contained 3.5% by weight of Li, 12% by weight of Cu and 3% by weight of Cr. A $C_4$ fraction containing 95.3 mol percent of butadiene-1,3, 1.5 mol percent of hydrogen and 0.1480 mol percent of vinyl-, ethyl- and methylacetylene (principally ethylacetylene) was passed over 1 l. of this catalyst at normal pressure at the rate of 400 Nl./h. The hydrogenation chamber was maintained at 130–140° C. After leaving the chamber the gas mixture had a butadiene content of 95.1 mol percent. The acetylenic hydrocarbon content was not detectable (<0.0003 mol percent).

*Example 4*

The starting material for this example was a hydrocarbon fraction having a content of isoprene of 95.5% by weight and 0.3% by weight of methylbutene and methylbutenine. This fraction was passed as a gas at a rate of 400 Nl./h. over 1 l. of a catalyst produced as described in Example 2 excepting that silica gel was substituted for pumice as the carrier. 10% by volume of hydrogen was introduced into the gas before it entered the hydrogenation chamber. The chamber was maintained at 80–90° C. The resulting gas contained 95.4% by weight of isoprene. Methylbutine and methylbutenine were not detectable.

*Example 5*

A $C_4$ fraction containing 93.7 mol percent of butadiene-1,3, 3.0 mol percent of hydrogen and 0.1530 mol percent of vinyl-, ethyl- and methylacetylene (predominately ethylacetylene) was passed at a pressure of 5 atmospheres over 200 ml. of a catalyst that was made as described in Example 2 at the rate of 500 Nl. of gas per liter of catalyst per hour. The temperature of the chamber was maintained at 110–120° C. After leaving the chamber the acetylenic hydrocarbon content was less than 0.0003% while the butadiene-1,3 content remained practically constant at 93.6 mol percent.

*Example 6*

A $C_4$ fraction containing 13.5 mol percent of butadiene-1,3, 1.5 mol percent of hydrogen and 0.0450 mol percent of ethyl-, vinyl- and methylacetylene (principally ethylacetylene) was passed under a pressure of 6 atmospheres in contact with 200 ml. of a hydrogenation catalyst. The catalyst was prepared by simultaneously bringing aqueous solutions of copper nitrate, chromium (VI) oxide and magnesium nitrate into contact with silica gel, so that the finished reduced catalyst contains 15.5% by weight of copper, 4.5% by weight of chromium and 6.1% by weight of magnesium. After drying the catalyst is subjected to heat treatment at a gradually increased temperature up to 550° C. in a stream of air for about 24 hours to decompose the nitrate. Then after reduction for about 24 hours with hydrogen at 200° C. it is ready for use. The gas mixture is passed over the catalyst at the rate of 1000 Nl. of gas per liter of catalyst per hour while the temperature of the hydrogenation chamber is maintained at 100–110° C. After leaving the chamber the acetylenic hydrocarbon content of the gas is less than 0.0003% while the butadiene-1,3 content remains constant at 13.5 mol percent.

*Example 7*

(a) The starting material was a butadiene fraction containing 99.5 mol percent of butadiene-1,3 and 0.0360 mol percent of higher acetylenes (principally ethylacetylene). This fraction in the gaseous state is passed at the rate of 500 Nl./h. over 1 liter of catalyst with a simultaneous admixing therewith, before entering the hydrogenation chamber of 2% by volume of hydrogen. The temperature of the chamber was maintained at 110°–120° C. The catalyst was produced by the simultaneous deposition of aqueous solutions of copper nitrate and chromium VI oxide on silica gel so that the finished reduced catalyst contained 12.5% by weight of copper and 4.8% by weight of chromium. After drying the catalyst was heated up to 550° C. in about 24 hours in a stream of air to decompose the nitrate. After a final 24 hour reduction with hydrogen at about 200° C. the catalyst was ready for use. The butadiene stream, after hydrogenation with the above described catalyst, after leaving the hydrogenation chamber had a butadiene-1,3 content of 97.8 mol percent, based upon the amount of hydrocarbon used. The added hydrogen was not analytically considered. The butadiene loss was 1.7 mol percent. The acetylenic hydrocarbon content was not detectable (<0.0003%).

(b) The process described under (a) was repeated with the difference that the aqueous solutions used in the production of the catalyst contained magnesium nitrate so that the finished reduced catalyst contained 15.5% by weight of copper, 4.5% by weight of chromium and 6.1% by weight of magnesium. The resulting butadiene stream, without considering the hydrogen, contained 99.4% mol percent of butadiene-1,3 so that practically none of the butadiene was lost. Acetylenic hydrocarbon was not detectable (<0.0003%). The hydrogenation temperature was 100–110° C.

(c) The process was carried out under conditions similar to (b) above with the difference that barium nitrate was used instead of magnesium nitrate in the production of the catalyst so that the finished reduced catalyst contained 14.1% by weight of copper, 4.1% by weight of chromium and 7.0% by weight of barium. The hydrogenation temperature was 110–120° C. The resulting butadiene stream, disregarding hydrogen, contained 99.3 mol percent of butadiene-1,3 so that practically none of the butadiene was lost. Acetylenic hydrocarbon was not detectable (<0.0003%).

It is clear that the content of copper chromite alone (a) is responsible for the considerable loss of diolefine. The new catalysts (b and c) have a better selectivity in the hydrogenation and cause, in spite of an excess of hydrogen 2% by volume) practically no loss of diolefine.

I claim:
1. A mixed catalyst composition consisting essentially of copper chromite and containing from 5 to 50% by weight of metallic copper, from 1 to 50% by weight of chromium and from 0.1 to 50% by weight of a compound selected from the group consisting of oxides and hydroxides of the elements of groups Ia and IIa of the Periodic System of Mendeléeff.

2. A process for the reduction of the acetylenic hydrocarbon content of a hydrocarbon mixture containing it and a diolefine by selective hydrogenation in the gas phase which comprises passing the hydrocarbon mixture in the form of a gas and a quantity of hydrogen which is at least molecularly equivalent to said acetylenic hydrocarbon content at a temperature within the range from 30 to 250° C. and at a pressure within the range from 0.2 to 30 atmospheres over and in contact with the catalyst composition defined in claim 1.

References Cited by the Examiner

UNITED STATES PATENTS

| | | | |
|---|---|---|---|
| 2,969,407 | 1/1961 | Rosenberg et al. | 260—677 |
| 3,098,882 | 7/1963 | Arnold et al. | 260—677 |
| 3,108,947 | 10/1963 | Stijntjes | 260—677 |
| 3,128,317 | 4/1964 | Arkell et al. | 260—677 |
| 3,200,167 | 10/1965 | Reich | 260—681.5 |
| 3,218,268 | 11/1965 | Arnold | 260—681.5 |

ALPHONSO D. SULLIVAN, *Primary Examiner.*